US008256121B2

(12) United States Patent
Goodrich

(10) Patent No.: US 8,256,121 B2
(45) Date of Patent: Sep. 4, 2012

(54) FOLDING HAND TOOL HAVING AN AT LEAST PARTIALLY COMPOSITE HANDLE

(75) Inventor: Charles F. Goodrich, Vancouver, WA (US)

(73) Assignee: Leatherman Tool Group, Inc., Portland, OR (US)

( * ) Notice: Subject to any disclaimer, the term of this patent is extended or adjusted under 35 U.S.C. 154(b) by 1042 days.

(21) Appl. No.: 12/129,472

(22) Filed: May 29, 2008

(65) Prior Publication Data

US 2009/0293285 A1 Dec. 3, 2009

(51) Int. Cl.
*B26B 3/06* (2006.01)
*B25G 1/00* (2006.01)
(52) U.S. Cl. .......................................... 30/153; 81/489
(58) Field of Classification Search ............... 29/527.1, 29/592; 30/153; 81/489, 22
See application file for complete search history.

(56) References Cited

U.S. PATENT DOCUMENTS

| 5,657,674 | A | * | 8/1997 | Burnett ........................... 81/22 |
| 5,970,828 | A | | 10/1999 | Bondhus et al. |
| 2006/0075570 | A1 | | 4/2006 | Gelfand |

FOREIGN PATENT DOCUMENTS

| GB | 117 744 A | 8/1918 |
| GB | 414973 | 8/1934 |
| GB | 446164 | 4/1936 |
| GB | 531196 | 12/1940 |
| GB | 565435 | 11/1944 |
| GB | 872 587 A | 7/1961 |
| JP | 05 000460 A | 1/1993 |
| JP | 2009 226816 A | 10/2009 |
| WO | WO 2005/032793 A1 | 4/2005 |

OTHER PUBLICATIONS

Partial European Search Report for Application No. EP 09 16 0528 mailed Mar. 26, 2010.
Extended Search Report for European Application No. 09160528.7 dated Nov. 19, 2010.

* cited by examiner

*Primary Examiner* — John C Hong
(74) *Attorney, Agent, or Firm* — Alston & Bird LLP

(57) ABSTRACT

A hand tool, a handle of a hand tool and associated methods for fabricating the handle of a hand tool are provided in order to reduce the weight and thickness of the resulting hand tool. The handle generally includes a composite portion fabricated of fibers embedded in a matrix material in such a manner such that the composite portion meaningfully contributes to the strength of the handle and, in turn, the hand tool. In this regard, the composite portion may include a relatively high percentage of fibers, relatively long fibers and/or fibers that are generally aligned with respect to the longitudinal axis of the handle. For example, the composite portion may include fibers that constitute at least 50% by volume, fibers that are at least 30 mm in length on average and/or fibers that are within 15° of being parallel to the longitudinal axis of the handle.

25 Claims, 7 Drawing Sheets

FOLDING HAND TOOL HAVING AN AT LEAST PARTIALLY COMPOSITE HANDLE

FIELD OF THE INVENTION

Embodiments of the present invention relate generally to hand tools and, more particularly, to a hand tool having a folding implement and a handle formed at least partially of a composite material.

BACKGROUND OF THE INVENTION

A variety of hand tools have been developed including hand tools having folding implements. For example, hand held knives include knives having folding blade designs. By including folding implements, such as a folding pocket knife, a hand tool can include one or more implements in a relatively compact package. Moreover, the capability of folding an implement at least partially into the handle may increase the safety of these hand tools since the implements need not extend from the handle in instances in which the hand tool is not in use. For example, a knife having a folding blade design can be disposed in a folded configuration when not in use such that the cutting edge of the knife blade is safely disposed within the handle and will not be a safety hazard.

Hand tools generally include a handle assembly having opposed handles that are spaced from one another to define an internal cavity. The internal cavity is, in turn, sized such that the folding implement(s) can be received within the internal cavity when in the folded configuration. A hand tool can also include liners disposed upon the inwardly facing surfaces of the handles to further define the internal cavity of the hand tool and to facilitate movement of the folding implement(s) into and out of the internal cavity. As such, the liners are generally formed of material, such as steel or titanium, that provides substantial strength and structural rigidity for the hand tool, while the handles provide more aesthetic features. As such, the handles may be formed of a wide variety of materials including various metals or combinations of metals and plastics.

The handle of a folding hand tool must provide substantial strength to the hand tool and its various implements. As such, many handles have been formed at least partially of metal and have cooperated with the metal liners in order to provide the requisite strength. In this regard, for a folding hand tool including a knife blade that is rotatably connected to one end of the handle, at least the portion of the handle to which the knife blade is rotatably connected is typically formed of metal. As such, even in instances in which the handles of a folding hand tool have been partially formed of a composite material, the composite material has been primarily provided for aesthetic purposes with the metal liners and the metal portions of the handle providing the majority of the strength for the folding hand tool.

As folding hand tools are generally carried by a person and, in many instances, are desirably carried in a pocket, it would be advantageous for a folding hand tool to be relatively lightweight and to be relatively thin. However, the metal liners and the metallic portions of the handles that are required to provide the requisite strength for a folding hand tool cause both the weight and the thickness of the hand tool to disadvantageously increase.

In addition to a knife blade, the folding hand tool can include one or more other implements including a bit driver, a saw blade, a bottle opener, a carabiner or the like. With respect to a bit driver, a bit driver is advantageously designed to receive a variety of different bits in order to increase the functionality of the hand tool. To facilitate the ease of operation by the user, it would be desirable for the extra bits, that is, the bits not presently engaged by the bit driver, to be stored and carried by the hand tool so as to be readily available to the user and to avoid loss of bits. As noted above, however, it is desirable for the hand tool to have a compact form such that the storage of the extra bits by the hand tool would desirably not increase the overall size of the hand tool or restrict the capability of the hand tool to assume a compact form.

BRIEF SUMMARY OF THE INVENTION

A hand tool, a handle of a hand tool and associated methods for fabricating the handle of a hand tool are provided according to embodiments of the present invention in order to reduce the weight and thickness of the resulting hand tool. In this regard, the handle generally includes a composite portion fabricated in such a manner such that the composite portion meaningfully contributes to the strength of the handle and, in turn, the hand tool. As such, the amount of metal included in the handle of the hand tool can be reduced or, in some instances, eliminated, and metal liners may optionally be similarly eliminated. As such, the resulting hand tool can be lighter and thinner without sacrificing and, in some instances, improving the strength characteristics of the hand tool.

In one embodiment, a hand tool is provided that includes a handle having a metal portion and a composite portion adjacent and affixed to the metal portion, and a folding implement rotatably engaged by the composite portion of the handle and configured to move between a closed position in which the folding implement is at least partially disposed within an internal cavity at least partially defined by the handle and an open position in which the folding implement extends from the handle. The composite portion may be formed of a plurality of fibers embedded in a matrix material. At least 50% of the composite body may be formed of fibers with less than 50% of the composite body formed of the matrix material. In one embodiment, for example, at least 60% of the composite portion is formed of fibers. Additionally, the fibers may have an average length of at least 30 millimeters and, in one embodiment, at least 40 millimeters. With respect to a handle that extends lengthwise between opposed ends, a majority of the fibers may also be aligned in the lengthwise direction. As a result of the strength of imparted by the construction of the composite portion, the composite portion of the handle may be sufficiently strong to rotatably engage a folding implement, such that the metal portion merely forms a butt end of the handle relative to the folding implement.

A handle for a hand tool may also be provided that includes both metal and composite portions. The metal portion includes a tab and defines at least one pocket in the tab. The composite portion is adjacent and affixed to the metal portion. In this regard, the tab extends into the composite portion with the composite portion including at least one engagement member that extends into, but not beyond the at least one pocket. For example, the pocket defined by the tab may be a hole extending through the tab such that the engagement member of the composite portion fills the hole defined by the tab so as to be flush with a first surface of the tab without extending beyond the first surface of the tab.

The handle of this embodiment may extend lengthwise between opposed ends with the metal portion forming one end of the handle and the composite portion forming the other end of the handle. As such, the tab may also extend in the lengthwise direction to facilitate the secure engagement of the metal and composite portions. As a result of the strength provided by the composite portion, the composite portion may be configured to rotatably engage a knife blade with the metal portion forming the butt end of the handle.

The metal portion may have opposed inner and outer major surfaces with the composite portion of one embodiment also extending along the inner major surface of the metal portion. In this regard, the metal portion may also have an inwardly extending edge portion such that the inner major surface is recessed relative to the edge portion. As such, the composite portion may fill the recess defined by the inwardly extending edge portion.

In one embodiment, the handle for a hand tool includes a composite body having a plurality of fibers embedded in a matrix material. In order to provide the requisite strength, at least 50% of the composite body may be formed of fibers with less than 50% of the composite body therefore being formed of the matrix material. For example, at least 60% of the composite body of one embodiment is formed of fibers. In order to further strengthen the composite body, the fibers may have an average length of at least 30 millimeters and, in one embodiment, the average length of at least 40 millimeters. In order to still further strengthen the composite body, the majority of the fibers may be aligned in a lengthwise direction between the opposed ends of the handle. As noted above, the handle may also include a metal portion adjacent and affixed to the composite body.

The handle of a hand tool in accordance with another embodiment of the present invention includes a body extending lengthwise between opposed ends with the body formed of a metal portion at least partially defining a pocket configured to receive a bit. In order to release or engage the bit, the metal portion also includes a spring member that at least partially defines the pocket. In order to reduce wear on the bit as the bit is inserted into and removed from the pocket, the body may also include a composite cladding that coats at least some and, in one embodiment, all internal surfaces of the pocket. For example, the composite cladding may coat the internal surface of the spring member. The pocket of this embodiment may also be defined by a rear surface, opposite the spring member, which is formed of the same composite material as the composite cladding. Additionally, in some embodiments, the handle defines a finger recess proximate the pocket to facilitate the user's removal of the bit from the pocket with the composite cladding also coating the finger recess in one embodiment. The body of the handle extends lengthwise between opposed ends with the pocket opening through a transverse side of the body in accordance with one embodiment.

Methods of fabricating at least a portion of a handle of a hand tool are also provided in accordance with other embodiments of the present invention. In this regard, the method of one embodiment provides a mold defining at least a portion of the handle. Relative to the handle that extends lengthwise between opposed ends, the mold defines a gate at one of the opposed ends. A composite material, such as that described above having at least 50% fibers and, in one embodiment, at least 60% fibers as well as fibers having an average length of at least 30 millimeters and, in one embodiment, at least 40 millimeters are injected along with matrix material through the gate at one of the opposed ends of the handle. By injecting the fibers through the gate positioned at one end of the handle, the fibers generally align in a lengthwise direction, thereby strengthening the handle. The composite material is then permitted to solidify to form at least a portion of the handle. While the composite material may form the entire handle, the method of one embodiment also engages a metal portion with the composite material such that the resulting handle is comprised of both the metal portion and a composite portion formed of the composite material.

In another embodiment of a method of fabricating a handle of a hand tool, a metal portion having a tab and defining at least one pocket in the tab is provided. The metal portion is positioned relative to a mold such that the tab is disposed within the mold. The mold is then filled with the composite material such that the plastic material extends into but not beyond the pocket. The composite material is then permitted to solidify to secure the metal portion to the composite material to thereby form the handle. As noted above, the pocket may, in one embodiment, be a hole such that the composite material fills the hole defined by the tab so as to be flush with a first surface of the tab without extending beyond the first surface of the tab, thereby securely connecting the metal and composite portions of the handle.

The handle may extend lengthwise between opposed ends. As such, the metal portion may be positioned relative to the mold such that the tab extends in the lengthwise direction from the remainder of the metal portion. As such, the metal portion can form one end of the handle, while the composite portion can form the other end of the handle.

The metal portion may have opposed inner and outer major surfaces. As such, the positioning of the metal portion relative to the mold may position the metal portion such that the composite material also extends along the inner major surface of the metal portion. In this regard, the metal portion may also have an inwardly extending edge portion such that the inner major surface is recessed relative to the edge portion. As such, the metal portion may be positioned relative to the mold such that the composite material fills the recess defined by the inwardly extending edge portion proximate the inner major surface of the metal portion. As before, the mold that is filled with the composite material may define a gate at one of its opposed ends such that the composite material that is injected through the gate into the mold includes fibers that are generally aligned in a lengthwise direction.

By fabricating handles as described above which may include relatively high percentages of relatively long fibers that are generally aligned in the lengthwise direction, the strength provided by the composite portion of the handle is significant. As such, the hand tool having a handle in accordance with embodiments of the present invention may no longer require a liner and may significantly reduce, if not eliminate, the metal included within the handle. As a result of the strength provided by the composite portion of the handle, however, the strength of the handle is not sacrificed and, in some instances, is actually increased relative to that of conventional handles.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
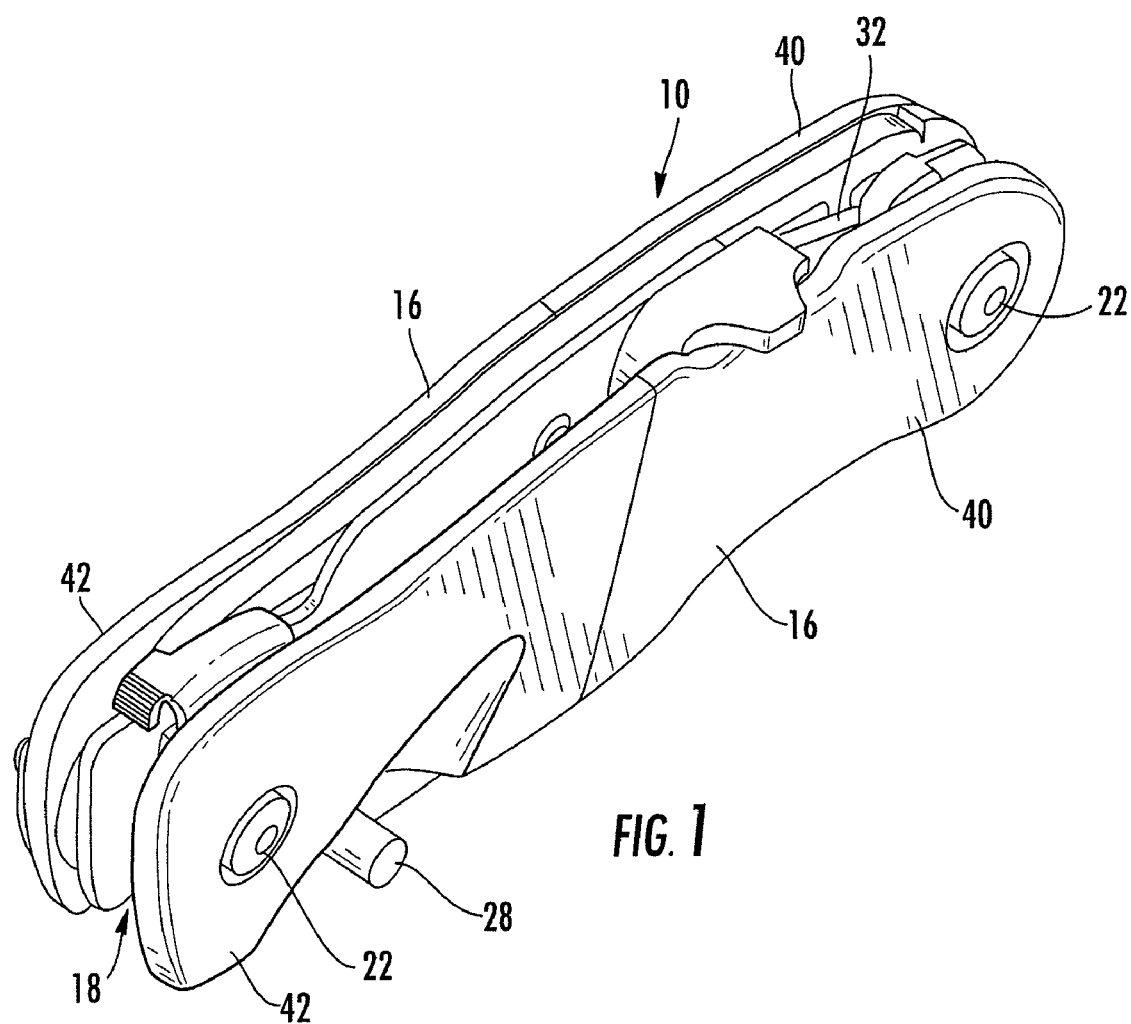
FIG. 1 is a perspective view of a hand tool according to an embodiment to the present invention in the folded configuration.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIGS. 1-3 and FIG. 4, a hand tool 10 according to one embodiment is depicted in folded and open configurations, respectively. As shown, the hand tool includes a rotatable implement that is configured to be moved between folded and open positions. For example, the rotatable implement may include a knife blade 12 as depicted in FIGS. 1-4 and as will be described below by way of example. However, the hand tool can include a wide variety of other rotatable implements, such as a saw, a serrated blade, a screwdriver, an awl, a bottle opener, a can opener, a file or the like.

In addition to the rotatable implement 12, the hand tool 10 also includes a handle assembly. In the illustrated embodiment, the handle assembly includes opposed handles 16 that are spaced from one another to define an internal cavity 18. The internal cavity may be sized such that the rotatable implement can be received within the internal cavity in the folded position. The handle assembly of the embodiment depicted in FIGS. 1-4 includes first and second handles that are spaced apart by one or more spacers that are disposed between and/or extend inwardly from one or both of the handles. The handle assembly of this embodiment also includes one or more fasteners 22 for securely connecting the first and second handles. In this regard, the fasteners can extend through the spacer(s) and the first and second handles to securely join the components of the handle assembly.

Figure 2:
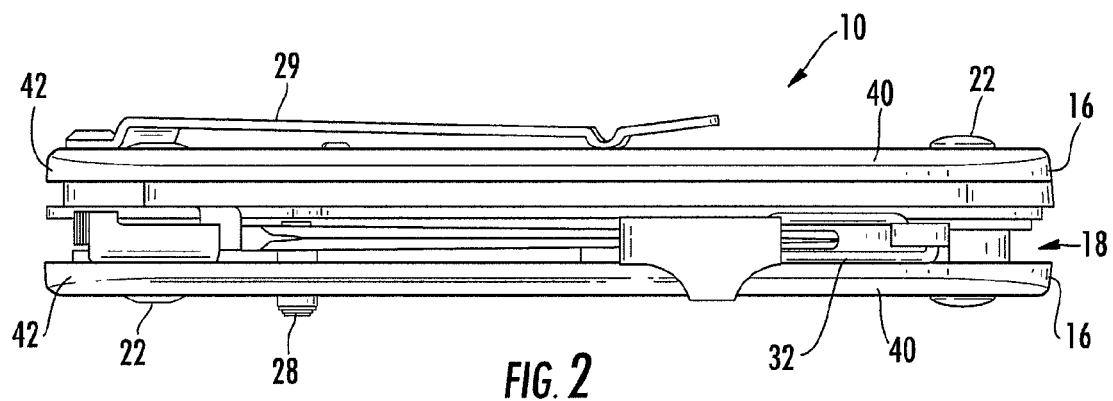
FIG. 2 is a plan view of the folding hand tool of one embodiment of the present invention which illustrates the various implements folded into the internal channel.
Figure 3:
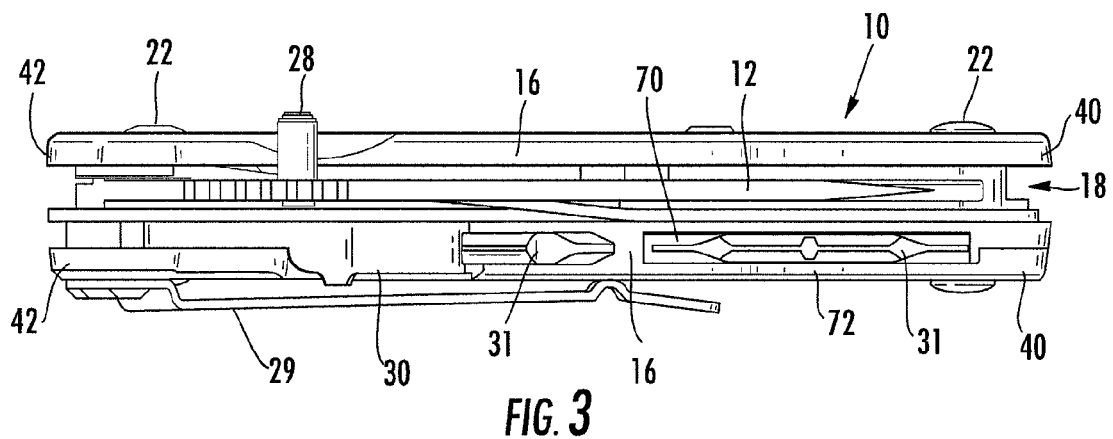
FIG. 3 is a plan view of the folding hand tool of one embodiment of the present invention taken from the side opposite that depicted in FIG. 2.
Figure 4:
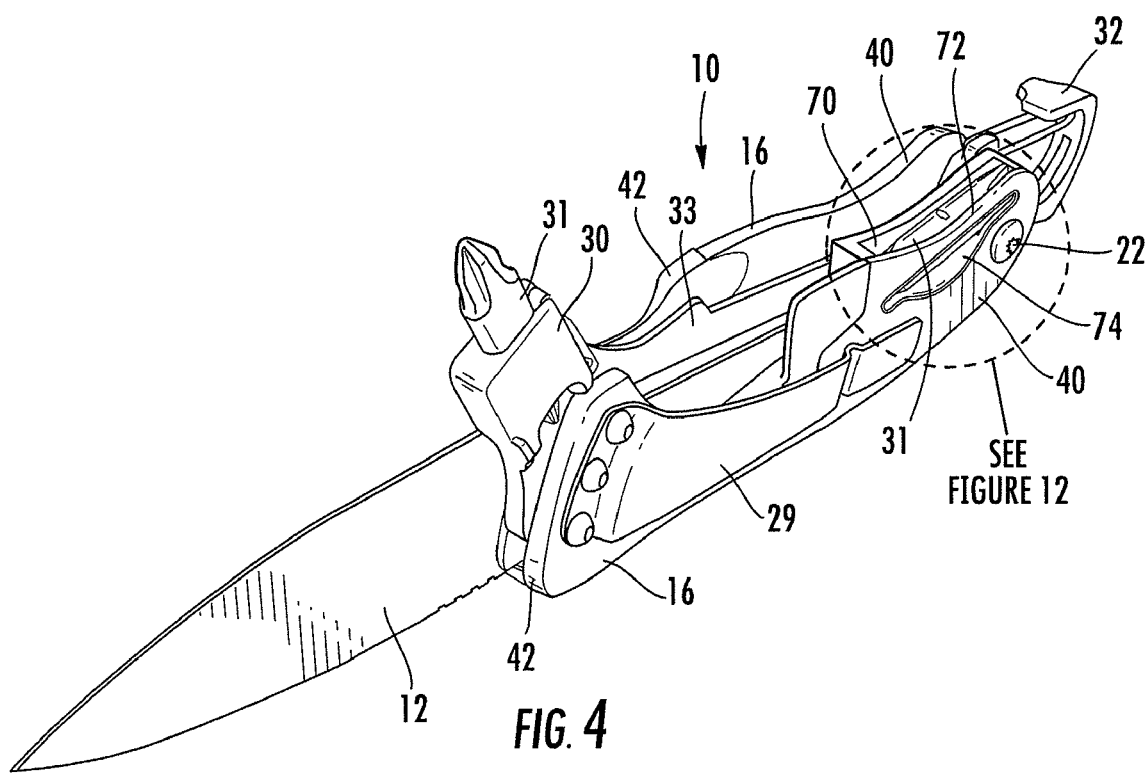
FIG. 4 is a perspective view of the opposite side of the folding hand tool of FIG. 1 in which the various implements have been unfolded so as to be in an open configuration.

The rotatable implement 12 of the hand tool 10 is connected to the handle assembly such that the rotatable implement is configured for rotation relative to the handles 16. In this regard, the rotatable implement can be connected to the handles by means of a fastener 22, such as a pin, extending from the handle assembly as described above and through the rotatable implement, such as through a tang of the knife blade. The fastener thereby defines the pivot point about which the rotatable implement moves with respect to the handle assembly. As such, the rotatable implement is configured to move between a folded position as shown in FIGS. 1-3 in which at least portions of the rotatable implement are disposed within the internal cavity 18 defined by the handle assembly to an open position as shown in FIG. 4 in which the rotatable implement extends from the handle assembly. With respect to a hand tool that includes a rotatable knife blade, the knife blade is typically folded at least partially into the handle assembly in the folded position such that the cutting edge of the knife blade is disposed within the internal cavity with only a portion of the spine of the knife being exposed.

In order to facilitate manual movement of the rotatable implement 12 from the folded position to the open position, the implement may include a thumb stud 28 or other feature extending outwardly from one or both sides of that portion of the implement that remains exposed when the implement is in the folded position. As such, a user can push upon the thumb stud in order to provide the motive force for rotating the implement from the folded position to the open position.

In order to further facilitate rotation of the implement 12 relative to the handle assembly, the hand tool 10 can include washers positioned between the handles and one or both sides of the tang of the rotatable implement in order to provide some space between the rotatable implement and the handles in order to facilitate rotational movement of the implement. These washers can be formed of a material, such as copper or phosphor bronze, thereby reducing the frictional forces that would otherwise have to be overcome in order to move the implement from the folded position to the open position.

While the hand tool 10 may have a single implement 12, e.g., a knife blade, the hand tool can include additional implements if desired. In this regard, the additional implements may be fixed implements that fixably extend from the handle assembly, such as the clip 29, and/or the additional implements may be additional rotatable implements that fold into the handle assembly, either on the same side as the implement as described above or from the opposite side of the handle assembly. In embodiments that include additional rotatable implements, the additional rotatable implements may also be pivoted about the same pivot point as the rotatable implement described above or the additional rotatable implement may be independently pivoted about a pivot point defined elsewhere along the handle, such as by a medial portion of the handles 16 or by the fastener 22 at the opposite end of the handles.

In the illustrated embodiment, the hand tool 10 includes a bit driver 30 that is rotatable about the same pivot point as the knife blade 12. The bit driver includes a body that defines a cavity that is sized and shaped to snugly receive at least a portion of a corresponding bit 31. The bit driver may receive a wide variety of bits including screwdriver bits, torx bits, hex bits, Robertson bits, etc. The hand tool of the illustrated embodiment also includes a carabiner 32 that is rotatable about a pivot point defined by the opposite end of the handle assembly. These additional implements are also configured to be rotated between a folded configuration in which the implements are at least partially disposed within the internal cavity 18 defined by the handle assembly and an open position in which the implements extend outwardly from the handle assembly.

The rotatable implements may, but need not, include or otherwise be associated with a locking mechanism for securing the implements in the open configuration. In the illustrated embodiment, for example, the hand tool 10 includes a liner lock for maintaining the knife blade 12 in the open configuration. In this regard, in instances in which the rotatable implement is in the open configuration, a leaf spring 33 of the liner lock is biased to move further into the internal cavity 18 from a position proximate one of the handles 16 so as to be positioned against the tang of the knife blade to prevent the blade from inadvertently closing. In order to return the rotatable implement to the closed configuration, the user must move the leaf spring toward the handle from which the leaf spring extends. As such, both as the rotatable implement moves between the open and closed configurations and while the rotatable implement is in the closed configuration, the leaf spring remains in position alongside a respective handle and provides no locking functionality, with the leaf spring serving to lock the knife blade only in the open configuration. However, the hand tool can include other types of locks, if so desired, either for the knife blade or the other rotatable implements. In this regard, for example, the illustrated embodiment of the bit driver 30 does not include a locking mechanism, while the carabiner 32 includes a locking mechanism in which the carabiner must be pushed in the lengthwise direction prior to or concurrent with being rotated to the folded configuration.

As noted above, the handle assembly includes a pair of handles 16 that, according to embodiments of the present invention are at least partially formed of a composite material. In this regard, while the handles of one embodiment of the present invention may be formed entirely of a composite material, the handles of the illustrated embodiments that are described hereinafter are comprised of a metal portion 40 and a composite portion 42 that are adjacent and affixed to one another. Typically, the metal portion is positioned proximate one longitudinal end of the hand tool 10, while the composite portion is primarily positioned proximate the other longitudinal end of the hand tool. As a result of the strength provided by the composite portion of the hand tool as will be described below, the composite portion of one embodiment can form the end of the handle that rotatably engages the rotatable implement, such as the knife blade 12. As such, the metal portion may correspondingly form the butt end of the handle relative to the rotatable implement.

The metal portion 40 may be formed of various metallic materials, but in one embodiment is formed of stainless steel. As noted above, the metal portion may define one end of a handle 16, while the composite portion 42 may form the other end of the handle. As such, the metal portion may be a relatively solid piece of material that contacts or abuts the composite portion only at one end thereof. In the embodiment illustrated in FIGS. 5 and 6, however, the metal portion includes inner and outer major surfaces 44, 46 with an inwardly extending edge portion 48 about the periphery thereof. The edge portion extends inwardly (with respect to the assembled hand tool 10) relative to the inner major surface of the metal portion such that an interior section of the metal portion is recessed relative to the edge portion. Thus, the composite material that forms the composite portion of the handle may also fill the recess defined by the metal portion, thereby potentially further reducing the weight and cost of the handle, while possibly increasing the strength of the handle. Thus, the metal portion of this embodiment can form the exterior and edge surfaces of one end of the handle with composite material filling the internal recess defined by the metal portion. In the embodiment of the metal portion depicted in FIGS. 5 and 6 as well as the embodiment of the handle depicted in conjunction with FIGS. 7-11 and described below, the metal and composite portions of one of the handles are shown, namely, the forwardmost handle in FIG. 1. While the other handle typically has a somewhat different shape as shown in FIG. 4, the other handle may be formed in an analogous manner to the handle depicted in conjunction with FIGS. 7-11 such that the depiction of the handle in FIGS. 7-11 and the corresponding description below are provided by way of example, but not of limitation.

Figure 5:
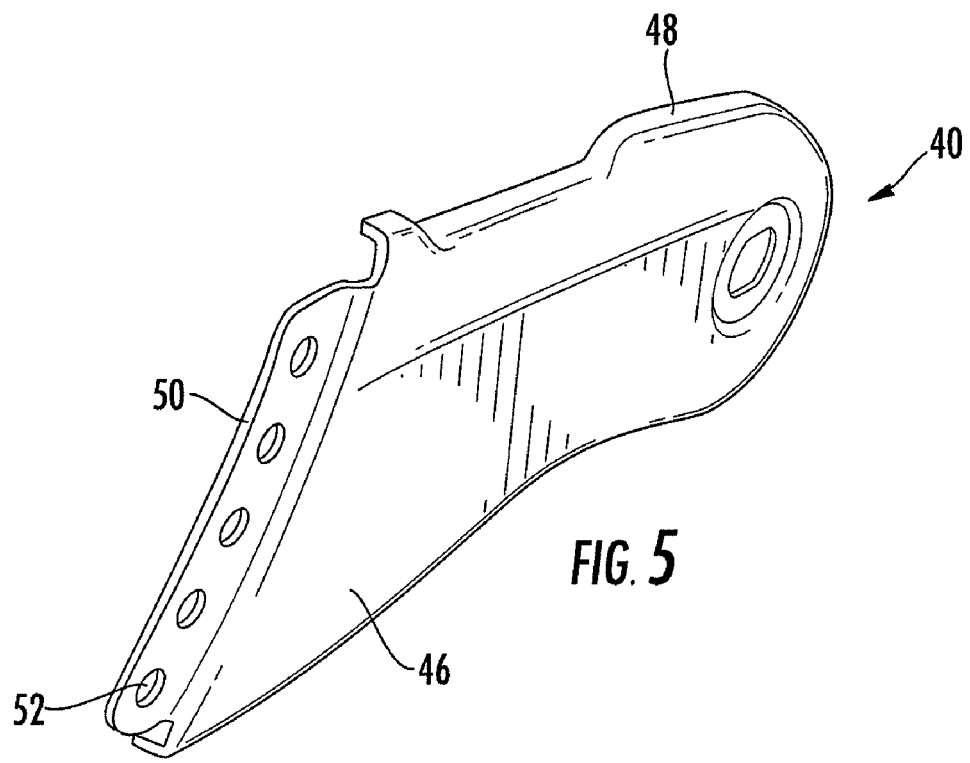
FIG. 5 is a perspective view of the metal portion of the handle in accordance with one embodiment to the present invention.
Figure 6:
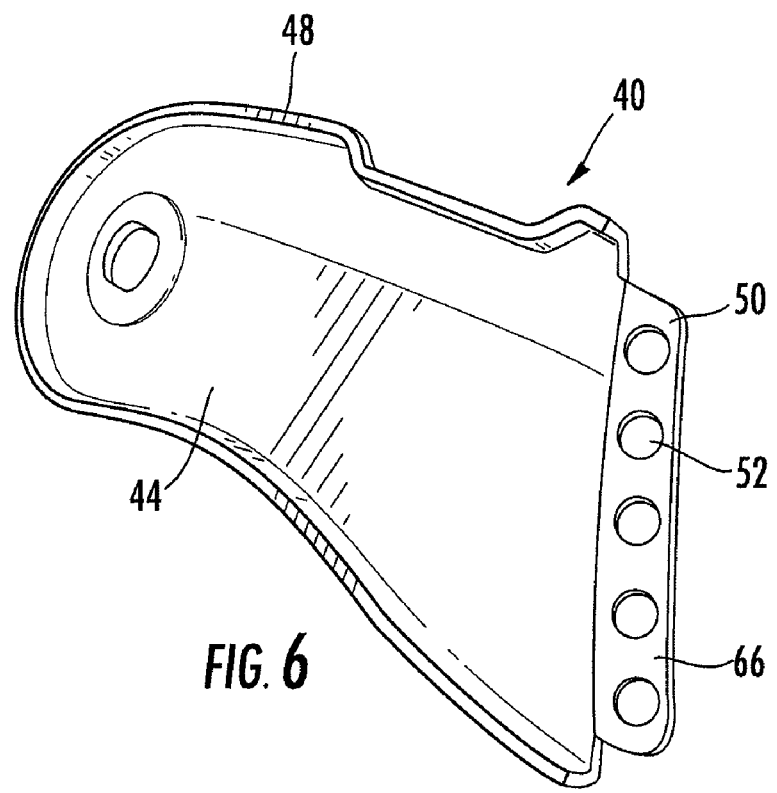
FIG. 6 is a perspective view of the metal portion of the handle of FIG. 5 taken from the opposite side.

The metal portion 40 also generally includes a tab 50 extending lengthwise from one end thereof. The tab is generally spaced from the outer major surface 46 of the metal portion and, in one embodiment, may be aligned with the distal or inwardmost portions of the inwardly extending edge portion 48, as more clearly shown in FIGS. 8B and 9B described below. The tab defines one or more pockets 52. In this regard, the tab may define pockets that do not extend completely through the tab, but are, instead, depressions or recesses therein. Alternatively, the tab may define the pockets so as to extend completely through the tab, thereby defining holes in the tab as illustrated in FIGS. 5 and 6. Generally, the tab defines a plurality of pockets spaced relatively evenly across the width of the tab. As described below, the tab and the pockets defined thereby facilitate the affixation of the metal portion to the composite portion 42 of the handle 16 with the composite portion including respective engagement members for extending into the respective pockets.

The composite portion 42 of the handle 16 includes a composite body formed of a plurality of fibers embedded in a matrix material. While a variety of materials may be utilized to form the fibers and the matrix material, the composite material of one embodiment, includes a plurality of glass fibers embedded in a nylon material. In order to provide the desired strength, the composite portion includes a relatively high percentage of fibers by volume. For example, the composite portion may include at least 50% by volume of fibers, such that less than 50% by volume is formed of the matrix material. In one advantageous embodiment, at least 60% by volume of the composite portion is formed of fibers. In addition to including a relatively large percentage of fibers by volume with respect to the matrix material, the composite portion may also include fibers that are relatively long in order to further strengthen the composite material. In this regard, the composite portion of one embodiment is formed of fibers having an average length of at least 30 millimeters and, more advantageously, an average length of at least 40 millimeters.

Not only are the fibers of the composite portion 42 of one advantageous embodiment relatively long, but the composite portion of one embodiment includes fibers that are generally aligned in a lengthwise direction, that is, in a direction extending from one longitudinal end of the hand tool 10 toward the other longitudinal end of the hand tool 10. By being generally aligned in a lengthwise direction, it is meant that a majority of the fibers are within a predefined angular range of being parallel to a longitudinal axis defined by the handle 16 so as to extend lengthwise therethrough. In one embodiment, the fibers are aligned such that a majority of the fibers are disposed within 15 degrees and, more particularly, within 10 degrees of being parallel to the longitudinal axis defined by the handle.

By forming a handle 16 having a composite portion 42 that has a relatively large percentage of fibers, relatively long fibers, and/or fibers aligned in a generally lengthwise extending direction, the strength of the composite portion and, in turn, the handle is improved such that the handle may have the same or better strength than a conventional handle, while being both lighter and thinner than a conventional handle. As a result of the strength provided by the composite portion of the handle, the amount of metal included in the handle may be reduced or eliminated without sacrificing strength. Additionally, the metal liners employed by conventional handles may be eliminated, again without sacrificing strength. By reducing the weight and the thickness of the handle, the hand tool 10 of embodiments of the present invention may be correspondingly made both lighter and thinner so as to facilitate the ease with which a user may carry the hand tool.

In order to form the handles 16, a mold 60 is generally provided that defines the shape and size of the composite portion 42 of the handle. In this regard, the mold generally defines an internal cavity 62 in the shape and size of the resulting composite portion. The mold also defines a gate 64 through which the composite material (both the fibers and the matrix material) is injected with the matrix material being in an at least partially molten state. As such, the gate is in communication with and generally opens into the internal cavity defined by the mold.

Figure 7:
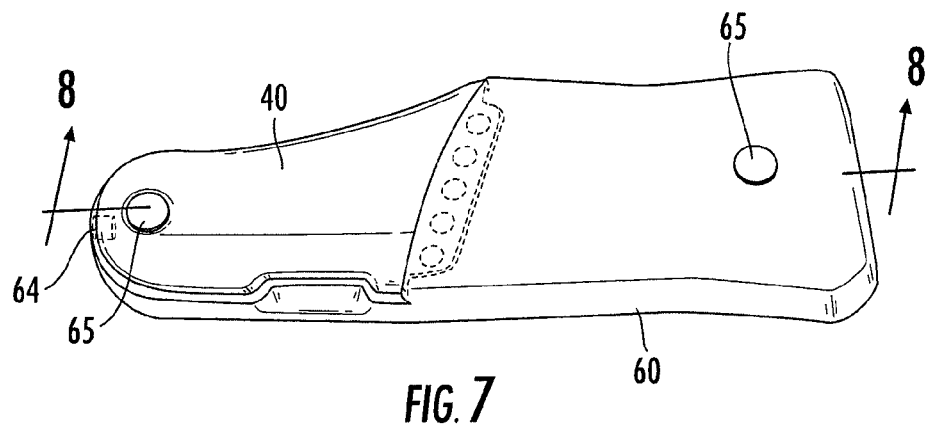
FIG. 7 is a perspective view of a mold and the associated metal portion of the handle which may be employed in order to fabricate a handle in accordance with one embodiment of the present invention.
Figure 8A:
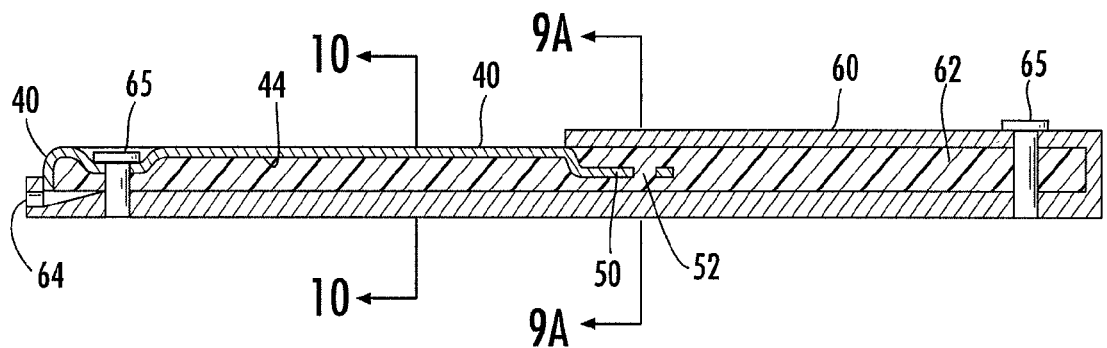
FIG. 8A is a cross-sectional view taken along line 8A-8A of FIG. 7.
Figure 8B:
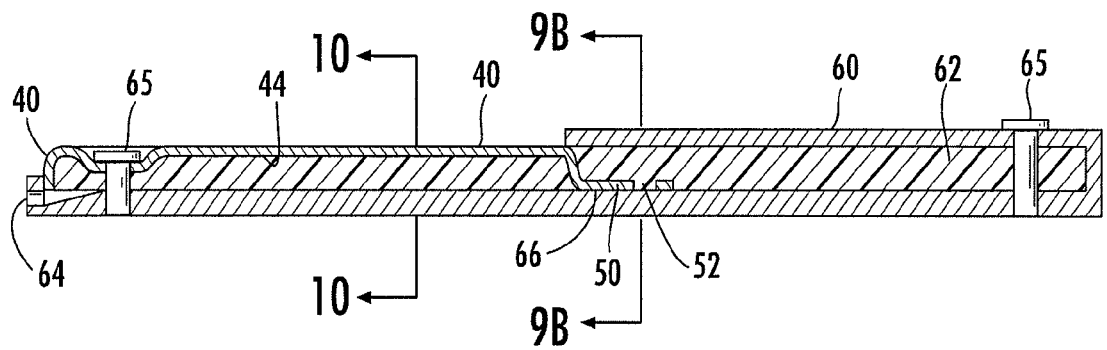
FIG. 8B is a cross-sectional view of a mold and the metal and composite portions in accordance with another embodiment of the handle of the present invention.
Figure 9A:
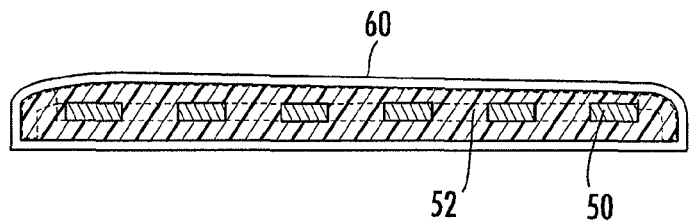
FIG. 9A is a cross-sectional view of the tab of the metal portion of the handle of one embodiment of the present invention taken along line 9A-9A of FIG. 8A which further illustrates the engagement of the tab and, in turn, the metal portion by the composite portion of the handle.

In order to engage the metal portion 40 of the handle 16 with the composite material, the metal portion may cooperate with the mold 60 so as to at least partially define the internal cavity 62. As shown in FIGS. 7, 8A and 8B, for example, the metal portion may mate with the remainder of the mold such that the inner major surface 44 of the metal portion, as well as the inwardly extending edge portions 48, define a portion of the interior cavity of the mold. It should be apparent, however, that the mold of other embodiments may be configured to receive the metal portion in other manners, such as by positioning the metal portion within the internal cavity of the mold. In any instance, the tab 50 extends into the internal cavity such that the composite material injected into the internal cavity of the mold enters into and, in one embodiment, fills the pockets 52 or holes defined by the tab as shown in cross-section in FIGS. 9A and 9B, as well as the recess defined by the concave shape of the metal portion as shown in cross-section in FIG. 10. As shown in FIGS. 8A and 9A, the metal portion and the mold are generally sized such that the tab is positioned in an interior portion of the internal cavity so as to be spaced from the sidewalls of the mold. For example, the composite portion may have a thickness of 0.120 inch and the tab may be displaced by 0.40 inch from the outward surface of the handle 16. As such, the composite material surrounds or encapsulates the tab and, in one embodiment, the composite material extends completely through the holes defined by the tab. In order to form the holes in the handle through which the fasteners 22 will thereafter extend, pins 65 may extend through the mold to define the respective holes.

Figure 9B:
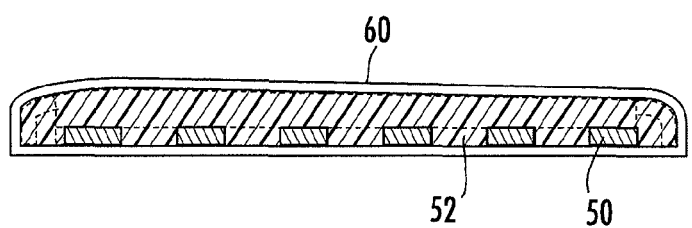
FIG. 9B is a cross-sectional view of the tab of the metal portion of the handle of another embodiment of the present invention taken along line 9B-9B of FIG. 8B which further illustrates the engagement of the tab and, in turn, the metal portion by the composite portion of the handle.
Figure 10:
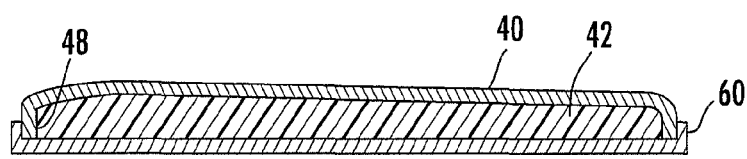
FIG. 10 is a cross-sectional view of a portion of the handle of one embodiment of the present invention taken along line 10-10 of FIGS. 8A and 8B which further illustrates the manner in which the composite portion underlies the metal portion and forms the rear portion of the handle.
Figure 11:
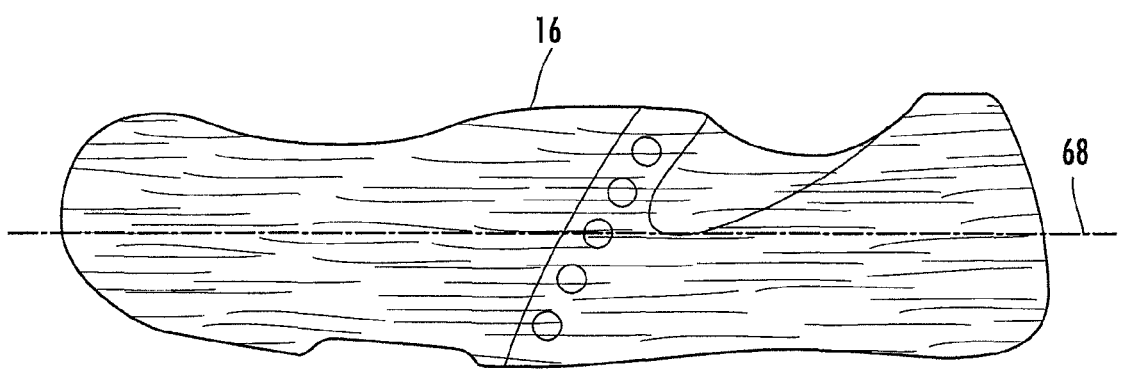
FIG. 11 is a schematic perspective view of the composite portion of a handle in accordance with one embodiment of the present invention which depicts the generally aligned and longitudinally oriented direction of the fibers.

As shown in FIGS. 8B and 9B, however, the metal portion 40 and the mold 60 of another embodiment may be sized such that a first surface 66 of the tab 50, such as the lower surface of the tab in the orientation of FIG. 8B, contacts an inner surface of the mold. As such, the composite material will be formed to be flush with the first surface of the tab, but will not completely encapsulate the tab since the composite material does not overlay the first surface of the tab.

As illustrated in FIGS. 7, 8A and 8B, the gate 64 defined by the mold 60 of one embodiment is positioned proximate and, more advantageously, at one longitudinal end of the resulting handle 16. As such, the composite material is injected through the gate at one longitudinal end of the handle and then moves lengthwise through the internal cavity 62 defined by the mold so as to fill the voids therewithin. In embodiments such as shown in FIGS. 8A and 9A in which the tab 50 is disposed within an interior portion of the internal cavity, the composite material can primarily flow between the tab and the mold, such as beneath the tab in the orientation of the illustrated embodiment. Alternatively, in embodiments such as shown in FIGS. 8B and 9B in which the tab contacts the mold, the width of the tab may be reduced to facilitate the flow of the composite material about the edges of the tab. As a result of the injection of the composite material through a gate defined at one longitudinal end of the mold, the fibers tend to align themselves so as to be parallel or relatively close to parallel to the longitudinal axis defined by the handle. As represented schematically in FIG. 11 which depicts the inner surface of the resulting handle (relative to the assembled hand tool 10) with some of the fibers illustrated for purposes of explanation, a majority of the fibers of the handle of one embodiment are within a predefined angular range, such as 15 degrees and, in one advantageous embodiment, 10 degrees, from the longitudinal axis 68 defined by the handle. Such alignment of the fibers in a direction generally parallel to the longitudinal axis may be achieved by the injection of the composite material through the gate defined at one longitudinal end of the handle, as opposed to a gate defined by a conventional mold at a location corresponding to a medial portion of the handle. Additionally, the injection of the composite material via a gate defined at one longitudinal end of the mold and the subsequent propagation of the composite material in a generally lengthwise direction facilitates at least some interweaving and entanglement of the fibers which further serves to strengthen the resulting handle. Following the injection of the composite material, the composite material is permitted to cure prior to removing the handle from the mold, thereby producing the handle having both a metal portion 40 and a composite portion 42 affixed to one another as a result of the engagement of the pockets 52, e.g., holes, of the tab 50 of the metal portion by the composite material.

Figure 12:
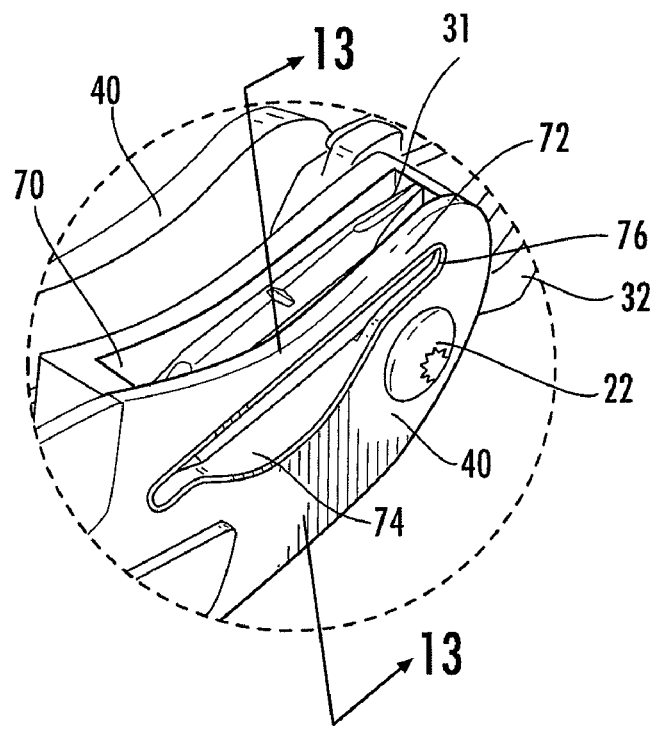
FIG. 12 is a perspective view of that portion of the handle of FIG. 1 which defines the pocket for storing additional bits.
Figure 13:
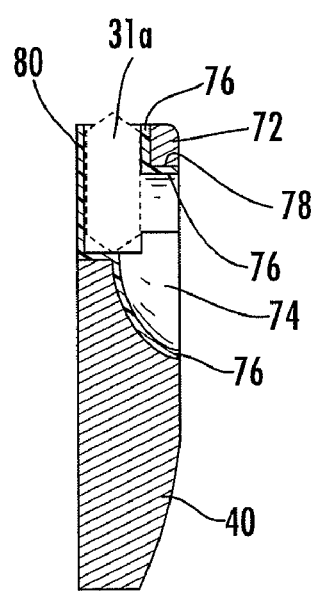
FIG. 13 is a cross-sectional view taken along line 13-13 of FIG. 12 depicting the composite cladding within the pocket defined by the handle in accordance with one embodiment to the present invention.

As noted above, the hand tool 10 can include a bit driver 30 for engaging corresponding bits 31, such as screwdriver bits, torx bits, hex bits, Robertson bits, etc. Accordingly, the hand tool of one embodiment is configured to store at least one bit in instances in which the bit is not engaged by the bit driver. As such, extra bits, i.e., bits that are not currently engaged by the bit driver, can be stored by the hand tool itself in order to avoid misplacement of the extra bits. As shown in FIGS. 3 and 4 and, in more detail, in FIGS. 12 and 13, for example, at least one of the handles 16 of the hand tool defines a pocket 70 opening through a transverse side of the respective handle, typically closer to one end than the other. Although the pocket 70 can be formed by the handle in various manners, the handle of one embodiment defines a recess and includes a spring member 72 extending across the recess.

As its name suggests, the spring member 72 is generally a relatively thin plate and is configured to flex or deflect a sufficient amount to permit insertion and withdrawal of the bit 31. While the spring member may be formed of various materials and may, accordingly, have various dimensions, the spring member of one embodiment is formed of hardened stainless steel and has a thickness of 0.010 inches to 0.050 inches and, more particularly, a thickness of about 0.030 inches.

The pocket 70 and the bit 31 may be sized such that the bit fits snugly within the pocket and is frictionally secured therein. For example, the handle 16 may define the pocket to have the shape of a rectangular solid and the shank portion 31a of the bit can have a corresponding polygonal shape with opposed major surfaces that frictionally engage the side surfaces of the pocket formed by the handle. As shown, the functional tips of the bit can extend from one or both ends of the polygonal-shaped shank portion.

The handle 16 can also define a recess 74 opening into the pocket 70. This recess is generally smaller than the bit 31 such that the bit cannot be inserted or withdrawn through the recess. However, the recess permits a user to touch the bit and to push the bit at least partially out of the pocket. The bit may then be grasped by the user and fully removed from the pocket. As such, the recess is generally positioned such that that portion of the bit that is inserted the furthest, i.e., deepest, into the pocket is exposed.

By securely retaining an extra bit 31 within the pocket 70 defined by the handle 16, the extra bit is carried with the hand tool 10 and is readily available to a user if needed. While the hand tool of the illustrated embodiment includes a pocket sized to store a single bit, the handle can define the pocket so as to be larger in order to removably store two or more bits. By disposing the extra bits within the handle, the bits can be advantageously stored without altering the functionality of the hand tool or increasing the size of the hand tool.

In order to facilitate the insertion and removal of the extra bit 31 within the pocket 70, the internal surfaces of the pocket generally have a cladding 76 formed of a composite material. The composite cladding can be relatively thin and may be formed of the same composite material as the composite portion 42 of the handle 16. For example, the internal surfaces of the spring member 72 and the surface of the finger recess 74 may include a composite cladding. Additionally, the side surface 78 of the spring member, such as the surface which faces downwardly in the orientation of the handle depicted in FIG. 13, may also include a composite cladding. The rear surface 80 of the pocket, that is, the most inward surface of the pocket is also generally formed of the composite material. While this surface may also be a composite clad metal, the entire rear surface may be formed of the composite material as shown in cross section in FIG. 13, if so desired. The pocket may be defined by the mold 60 such that the composite material is injected and flows and forms about the pocket so as to appropriately clad the metallic surfaces that define the pocket and to form the rear surface of the pocket. By internally cladding the pocket with the composite material, the potential wear and degradation of the extra bit as well as the pocket itself may be reduced in order to extend the useful life of the pocket.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A hand tool comprising:
   a handle comprising a metal portion and a composite portion adjacent and affixed to the metal portion, wherein the composite portion is comprised of a plurality of fibers embedded in a matrix material, wherein at least 50% of the composite portion is comprised of fibers and less than 50% of the composite portion is comprised of the matrix material, and wherein the fibers have an average length of at least 30 mm, wherein the handle extends between opposed first and second ends with the metal portion extending from the first end of the handle to a medial portion of the handle without extending to the second end of the handle, wherein one section of the metal portion defines an exterior surface of the handle and another section of the metal portion comprises a tab that defines at least one pocket, wherein the tab extends into the composite portion and is offset from the exterior surface of the handle by the composite portion, and wherein the composite portion comprises at least one engagement member that extends into the at least one pocket; and
   a folding implement rotatably engaged by the composite portion at the second end of the handle and configured to move between a closed position in which the folding implement is at least partially disposed within an internal cavity at least partially defined by the handle and an open position in which the folding implement extends from the handle,
   wherein the metal portion therefore forms a butt end of the handle and is spaced apart from a location at which the folding implement is rotatably engaged by the composite portion.

2. A hand tool according to claim 1 wherein at least 60% of the composite portion is comprised of fibers.

3. A hand tool according to claim 1 wherein the fibers have an average length of at least 40 mm.

4. A hand tool according to claim 1 which extends lengthwise between opposed ends, wherein a majority of the fibers are aligned in a lengthwise direction.

5. A hand tool according to claim 1 wherein the at least one engagement member extends into, but not beyond the at least one pocket.

6. A handle for a hand tool comprising:
   a metal portion comprising a tab and defining at least one pocket in the tab; and
   a composite portion adjacent and affixed to the metal portion,
   wherein the tab extends into the composite portion, and wherein the composite portion comprises at least one engagement member that extends into, but not beyond the at least one pocket.

7. A handle according to claim 6 wherein the at least one pocket comprises at least one hole extending through the tab, and wherein the at least one engagement member of the composite portion fills the at least one hole defined by the tab so as to be flush with a first surface of the tab without extending beyond the first surface of the tab.

8. A handle according to claim 6 which extends lengthwise between opposed ends, wherein the tab extends in the lengthwise direction from a remainder of the metal portion, and wherein the metal portion forms one end of the handle and the composite portion forms the other end of the handle.

9. A handle according to claim 8 wherein the composite portion is configured to rotatably engage a knife blade such that the metal portion forms a butt end of the handle.

10. A handle according to claim 8 wherein the metal portion has opposed inner and outer major surfaces, and wherein the composite portion also extends along the inner major surface of the metal portion.

11. A handle according to claim 10 wherein the metal portion also has an inwardly extending edge portion such that the inner major surface is recessed relative to the edge portion, and wherein the composite portion fills a recess defined by the inwardly extending edge portion proximate the inner major surface of the metal portion.

12. A handle for a hand tool comprising:
a metal portion; and
a composite body adjacent and affixed to the metal portion, wherein the composite body is comprised of a plurality of fibers embedded in a matrix material, wherein at least 50% of the composite body is comprised of fibers and less than 50% of the composite body is comprised of the matrix material, and wherein the fibers have an average length of at least 30 mm
wherein the handle extends between opposed first and second ends with the metal portion extending from the first end of the handle to a medial portion of the handle without extending to the second end of the handle, wherein one section of the metal portion defines an exterior surface of the handle and another section of the metal portion comprises a tab that defines at least one pocket, wherein the tab extends into the composite portion and is offset from the exterior surface of the handle by the composite portion, and wherein the composite portion comprises at least one engagement member that extends into the at least one pocket.

13. A handle according to claim 12 wherein at least 60% of the composite body is comprised of fibers.

14. A handle according to claim 12 wherein the fibers have an average length of at least 40 mm.

15. A handle according to claim 12 which extends lengthwise between opposed ends, wherein a majority of the fibers are aligned in a lengthwise direction.

16. A handle according to claim 12 wherein the metal portion forms a butt end of the handle.

17. A handle for a hand tool comprising:
a body extending lengthwise between opposed ends, said body comprised of a metal portion at least partially defining a pocket configured to receive a bit, said metal portion comprising a spring member that at least partially defines the pocket and releasably engages the bit, said body also comprised of a composite cladding that coats at least some internal surfaces of the pocket.

18. A handle according to claim 17 wherein the composite cladding coats all internal surfaces of the pocket including an internal surface of the spring member.

19. A handle according to claim 17 wherein the pocket is defined by a rear surface opposite the spring member, and wherein the body further comprises a composite portion that forms the rear surface and that includes the composite cladding.

20. A handle according to claim 17 further defining a finger recess proximate the pocket, wherein the composite cladding also coats the finger recess.

21. A handle according to claim 17 wherein the body extends lengthwise between opposed ends, and wherein the pocket defined by the metal portion opens through a transverse side of the body.

22. A hand tool according to claim 1 wherein the tab is positioned relative to the composite portion such that the composite portion is disposed on only one side of the tab.

23. A hand tool according to claim 1 wherein the tab is positioned relative to the composite portion such that the composite portion extends along opposite sides of the tab.

24. A handle according to claim 12 wherein the tab is positioned relative to the composite portion such that the composite portion is disposed on only one side of the tab.

25. A handle according to claim 12 wherein the tab is positioned relative to the composite portion such that the composite portion extends along opposite sides of the tab.

* * * * *